US011767127B2

(12) United States Patent
DeAngelis

(10) Patent No.: US 11,767,127 B2
(45) Date of Patent: Sep. 26, 2023

(54) AUTOMATED AVIATOR RECOGNITION SYSTEM AND METHOD FOR RECOGNIZING AN AVIATOR

(71) Applicant: Francesco E DeAngelis, Herndon, VA (US)

(72) Inventor: Francesco E DeAngelis, Herndon, VA (US)

(73) Assignee: Francesco DeAngelis, Herndon, VA (US)

( * ) Notice: Subject to any disclaimer, the term of this patent is extended or adjusted under 35 U.S.C. 154(b) by 549 days.

(21) Appl. No.: 17/081,019

(22) Filed: Oct. 27, 2020

(65) Prior Publication Data

US 2021/0122490 A1  Apr. 29, 2021

Related U.S. Application Data

(60) Provisional application No. 62/926,554, filed on Oct. 27, 2019.

(51) Int. Cl.
*B64D 45/00* (2006.01)
*H04B 17/318* (2015.01)
(Continued)

(52) U.S. Cl.
CPC ............. *B64D 45/00* (2013.01); *B64D 43/00* (2013.01); *H04B 17/318* (2015.01); *H04W 4/80* (2018.02); *H04W 48/04* (2013.01); *H04W 64/003* (2013.01)

(58) Field of Classification Search
CPC ...... B64D 45/00; B64D 43/00; H04B 17/318; H04B 17/27; H04W 4/80; H04W 48/04;
(Continued)

(56) References Cited

U.S. PATENT DOCUMENTS 8,280,741 B2   10/2012   Colin et al.
9,030,323 B2   5/2015   Lee
(Continued)

FOREIGN PATENT DOCUMENTS

| CA | 2912217 C | * 3/2021 | ............... A62B 3/00 |
|---|---|---|---|
| CN | 109473012 | 3/2019 | |
| GB | 560364 | 3/1944 | |

OTHER PUBLICATIONS

Thesis from Technological University Dublin entitled, "Asynchronous Ultrasonic Trilateration for Indoor Positioning of Mobile Phones," dated Dec. 2012.
(Continued)

*Primary Examiner* — Mary Cheung
(74) *Attorney, Agent, or Firm* — KED & ASSOCIATES

(57) ABSTRACT

An automated aviator recognition system and a method for recognizing an aviator in a cockpit of an aircraft are provided. The system and method allow an aviator to be recognized or identified from his/her mobile device, such as a smart phone. The automated aviator system may include a plurality of beacons configured to be located in a cockpit of an aircraft, each emitting a beacon signal, and a mobile device that communicates with the plurality of beacons, receives signal data from the plurality of beacons, sends the signal data to a system server via an Intranet or Internet connection or through a flight data collection and transmission device, the system processing the signal data to identify an aviator in possession of the mobile device and identify a location of the aviator within the cockpit as one of a captain chair or a copilot chair or another chair based on the processed signal data and providing aviator identification information to subscribed/authorized users and devices.

23 Claims, 7 Drawing Sheets

(51) Int. Cl.
*H04W 64/00* (2009.01)
*B64D 43/00* (2006.01)
*H04W 4/80* (2018.01)
*H04W 48/04* (2009.01)

(58) Field of Classification Search
CPC ... H04W 64/003; H04W 64/00; H04W 88/02; H04W 24/10; H04W 48/12
See application file for complete search history.

(56) References Cited

U.S. PATENT DOCUMENTS

| | | |
|---|---|---|
| 9,699,607 B2 | 7/2017 | Markhovsky et al. |
| 9,794,753 B1 | 10/2017 | Stitt et al. |
| 10,002,112 B2 | 6/2018 | Hamblin et al. |
| 2003/0169173 A1 | 9/2003 | Longere |
| 2004/0230352 A1 | 11/2004 | Monroe |
| 2008/0221886 A1 | 9/2008 | Colin et al. |
| 2011/0127380 A1 | 6/2011 | Orgerie et al. |
| 2013/0151291 A1 | 6/2013 | Salway |
| 2014/0259111 A1 | 9/2014 | Sampigethaya |
| 2017/0032682 A1 | 2/2017 | Moser |
| 2017/0076617 A1* | 3/2017 | Schupp ............... G08G 5/0013 |
| 2019/0057612 A1* | 2/2019 | Schupp ................. G06F 3/165 |
| 2019/0103030 A1 | 4/2019 | Banga et al. |
| 2019/0333397 A1* | 10/2019 | Schupp .................... G08G 5/04 |
| 2019/0369615 A1 | 12/2019 | Martinez Jara et al. |
| 2020/0089221 A1 | 3/2020 | Bilous et al. |

OTHER PUBLICATIONS

Article from School of Electronics Engineering, Chungbuk National University, Republic of Korea, entitled "Indoor Smartphone Localization Based on LOS and NLOS Identification," published Nov. 16, 2018.

Article posted on 101Computing.net entitled, "Cell Phone Trilateration Algorithm," dated Mar. 29, 2019.

* cited by examiner

AUTOMATED AVIATOR RECOGNITION SYSTEM AND METHOD FOR RECOGNIZING AN AVIATOR

CROSS-REFERENCE TO RELATED APPLICATION(S)

This application claims priority to U.S. Provisional Application No. 62/926,554, filed on Oct. 27, 2019, whose entire disclosure is hereby incorporated by reference.

BACKGROUND

1. Field

An automated aviator recognition system and method for recognizing an aviator in a cockpit of an aircraft are disclosed herein.

2. Background

Flight logs which include aviator or pilot information are produced and kept for most flights taken, especially in the commercial aviation space. A multitude of systems including regulatory logs, billing, safety, crew scheduling, maintenance, and training systems, for example, require knowledge of the aviator or pilot for any given flight.

Currently, in the general aviation space, aviator or pilot information is provided through manual entry into a logbook or electronic system and then shared between systems or personnel either manually or through periodic updates. It can take hours to days after a flight before the pilot information is populated in all the necessary places. This process slows down billing, scheduling, maintenance, training, and other operational aspects of aviation, for example, and has a cost impact on various organizations involved.

Flight data collection and transmission systems are being used more and more to relay necessary flight information, such as flight status, location, engine status, and fuel status, for example, immediately after a flight has landed. For example, the commercially available Air-Sync™ system provides such capabilities currently along with several other commercial and general aviation systems. These systems are increasing the efficiency of organizations across the aviation spectrum. One challenge, however, is automated and near real time identification of the pilot as there is currently not a practical way to sense who is piloting the plane.

U.S. Pat. No. 9,794,753 to Stitt et al., which is hereby incorporated by reference, describes a system and method for establishing a real-time location of a portable device (PD). The method and system are relevant toward an automated environment with a controller that takes immediate actions based on estimated location of the PD, such as mobilizing a vehicle or opening a door. This system is complicated and involves a master device, a controller, independent monitoring devices, a PD, and at least two separate channels of communication. The PD transmits a signal to the master, and the monitoring devices constantly receive and characterize that signal between the master and the PD, and make estimates of the PD's location which is then transmitted on a separate channel back to the master. The master may then forward the location information to the controller to take an action.

U.S. Pat. No. 9,699,607 to Markhovsky et al., which is hereby incorporated by reference, discloses a method for triangulating a location of a cell phone between receiver towers. In this method, at least 3 (8 recommended) towers or microtower devices at precisely known geographic locations are needed to communicate with the cell phone. Time differences between various towers and the cell phone are used in multilateration algorithms to determine the location of the cell phone. GPS signals are used when available. The teaching of this patent is to find the location of the cell phone with a lot of tower or micro-tower device infrastructure to the best precision possible, focusing on mitigation of multipath error. This type of system is complex and expensive and is used in larger systems and areas where many PD's are active.

U.S. Patent Pub No. 2019/0369615 to Martinez et al., which is hereby incorporated by reference, discloses a system and method for verifying vital signs of pilots in a cockpit. This system is based on sensing the presence of pilots in the cockpit and tracking a heart rate of each pilot measured by a heart rate sensor. The pilot carries a personal control unit (PCU) which communicates with a Central Control Unit (CCU). The PCU calculates a signal intensity from the CCU and if the intensity falls below a certain level, it is determined that the pilot is outside of the cockpit. Though the system is assessing the presence of pilots in the cockpit, it is not locating the pilots to any specific locations. To do that, multiple CCU's or auxiliary transmitters would be required, and a different methodology would need to be implemented.

U.S. Pat. No. 9,030,323 to Lee, which is hereby incorporated by reference, discloses a method and device for detecting the position of an object using radio-frequency identification (RFID). The method includes calculating a position of a moving object using a first RFID tag installed at a particular position in a predetermined space while the moving object is moving, detecting a second RFID tag included in the object, determining the position of the same at a certain point in time. Tags must be installed throughout a monitored space and tags must also be issued to the pilots. An external system with processing power, memory, and networking capability to the outside world must then be used to process the RFID signals, determine location, and communicate that location to stakeholders. This requires a lot of infrastructure with significant cost and effort to install and operate.

BRIEF DESCRIPTION OF THE DRAWINGS

Embodiments will be described with reference to the following drawings in which like reference numerals refer to like elements, and wherein.

DETAILED DESCRIPTION

Embodiments will now be discussed with reference to the drawings. Wherever possible, the same or like elements have been used to refer to the same or like elements, and repetitive disclosure has been omitted. Further, various embodiments are discussed and may utilize various components disclosed herein in various combinations.

Embodiments disclosed herein automate a process of identifying an aviator or pilot on a given flight, and thus, solves one of the challenges in near real time aviation operations management. Embodiments disclosed herein provide a system to automatically identify an aviator or pilot on a given flight in near real time via a pilot's mobile device, such as a smart phone, and a plurality of beacons located in a cockpit of the aircraft.

Embodiments disclosed herein determine who is sitting in, for example, a captain chair using signals from a plurality of beacons received and processed by a pilot's or a copilot's mobile device, for example. Receivers, such as wireless receivers in the mobile device may detect beacon signals emitted by the plurality of beacons and process them or store and send them to a server to process them to determine a relative distance of the mobile device from a captain chair or a copilot chair or another chair.

Embodiments disclosed herein may determine flight start and end times using an engine(s) on/off status. One or more of the plurality of beacons may turn on/off with the engine(s).

Embodiments disclosed herein provide an application and system with enrolled pilots. Thus, a given pilot's mobile device may be linked to the pilot through application and system databases.

Embodiments disclosed herein provide a system and method for automated identification of a pilot on a flight. The system and method may utilize a plurality of beacons strategically placed in a cockpit, which may be wireless beacons, an application on the pilot's mobile device, such as a smart phone, wireless radios of the mobile device to receive beacon signals, an algorithm that determines whether the mobile device is located in or near a captain chair or a copilot chair or another chair for a significant portion of a flight time by processing the beacon signals, an optional device that can send the stored beacon signal data via Internet or Intranet connection, and a server that communicates, collects, processes, and disseminates information from the pilot's mobile device to connected client devices and systems.

Figure 1:
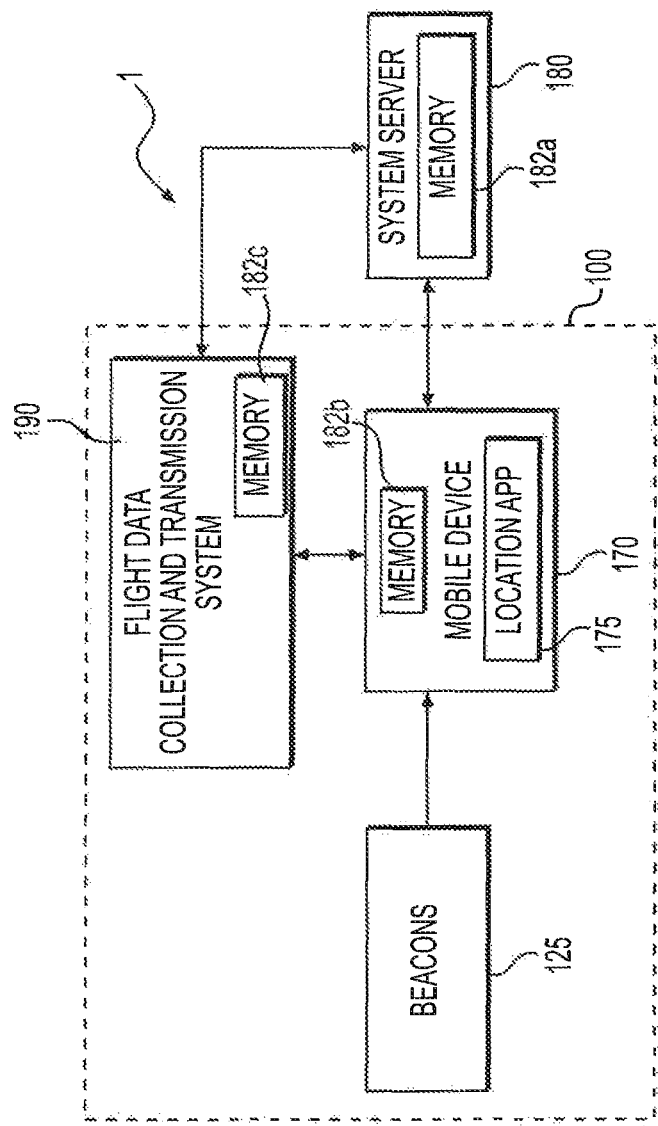
FIG. 1 is a schematic diagram of an automated aviator recognition system according to an embodiment.

FIG. 1 is a schematic diagram of an automated aviator recognition system according to an embodiment. The automated aviator recognition system 1 according to an embodiment may include a plurality of beacons 125, a mobile device 170, and a system server 180. The system 1 may also include an optional flight data collection and transmission system 190 which transmits stored beacon data from the mobile device 170 to system server 180 via an Internet or Intranet connection.

The mobile device 170 may be, for example, a smart phone. Alternatively, the mobile device may be tablet, or a personal computer, for example. The mobile device 170 may include a receiver configured to receive beacon signals from the plurality of beacons 125. The receiver may be configured to wirelessly receive beacon signals from the plurality of beacons 125 and may use, for example Bluetooth or Wi-Fi.

The automated aviator recognition system 1 according to an embodiment may include a location application 175, which may be a software application or "app" that is downloaded onto the mobile device 170.

The server 180 according to an embodiment may be an Intranet or Internet connected server. The server 180 may communicate, collect, process, and disseminate information associated with the beacon signals or identified aviator and flight information received from the mobile device 170 to connected devices and systems.

The flight collection and transmission system 190 may be a device such as the commercially available Air-Sync™ device which collects and transmits flight data over cellular or Wi-Fi networks to system server 180 via an Internet or Intranet connection. The flight data collection and transmission system 190 may wireless communicate with the mobile device 170, the wireless communication system being Wi-Fi or Bluetooth, for example.

The mobile device 170 may collect, process, and store signal data and forward the processed signal data and/or aviator and flight information to the system server 180. Alternatively, the mobile device 170 may collect signal data and forward the signal data to the system server 180 for processing and storage. Alternatively, the mobile device 170 may collect signal data and forward the signal data to the flight data collection and transmission system 190 for processing, storage, and/or transmission to the system server 180.

The plurality of beacons 125 may be located in a cockpit 100 of an aircraft, and may include at least two ranging beacons 130, 135 (see FIG. 3) that each emits a periodic beacon signal at a predetermined signal strength. The mobile device 170 and/or location app 175 may determine a respective range to each of the at least two ranging beacons 130, 135 based on at least one of a received signal level or timing information. The range of the mobile device 170 to each of the at least two ranging beacons 130, 135 may be determined based on a received signal strength in comparison to the predetermined signal strength at which the beacon signal was transmitted and known loss per unit distance. The range of the mobile device 170 to each of the at least two ranging beacons 130, 135 may be determined based on a transit time for the beacon signal.

The at least two ranging beacons 130, 135 may be battery operated. Alternatively, the at least two ranging beacons 130, 135 may be powered by and configured to turn on and off with an engine(s) of the aircraft.

The plurality of beacons 125 may include at least one timing beacon 140 that emits a timing signal that indicates that a flight is in process. The at least one timing beacon 140 may be turned on and off with the engine(s) of the aircraft.

The automated aviator recognition system 1 may recognize or identify an aviator or pilot in possession of the mobile device 170, and recognize or identify a location of the aviator within the cockpit 100 as one of a captain chair 110 or a copilot chair 120 or another chair. The identification of the location of the aviator within the cockpit 100 to the captain chair 110 indicates that an owner of the mobile device 170 is the captain or pilot for the aircraft during the flight. The mobile device 170 may alert the owner of the mobile device 170 that he or she has been identified as the aviator for the flight and allow the owner to manually confirm or deny. The location of the aviator in the cockpit 100 may be identified as one of the captain chair 110 or the copilot chair 120 or another chair to which the mobile device 170 is closest. The identification of the location of the aviator within the cockpit 100 as one of the captain chair 110 or the copilot chair 120 or another chair may be performed two or more times and averaged or weighted averaged over a flight to determine with a high degree of statistical confidence which chair was associated with the location of the aviator within the cockpit 100. The automated aviator recognition system 1 may include a memory 182 (182a, 182b, 182c) in which signal data and other information, including a location of the plurality of beacons 125 to the captain chair 110 and the copilot chair 120 and any other chair for each model of aircraft may be stored. The memory 182 (182a, 182b, 182c) made be provided in the mobile device 170, the system server 180, and/or the flight data collection and transmission system 190, The automated aviator recognition system 1 may use known and standard trilateration and multilateration techniques as part of its location algorithm. For example, the plurality of beacons 125 may include three ranging beacons 230, 235, 236 that each emits a periodic beacon signal at a predetermined signal strength coplanarly located in cockpit 100 (see FIG. 4), and a two-dimensional trilateration algorithm may be used to determine a location of an aviator within cockpit 100 and associate it with one of captain chair 110 or copilot chair 120 or another chair. Alternatively, three ranging beacons 330, 335, 336 that each emits a periodic beacon signal at a predetermined signal strength may be located in cockpit 100 (see FIG. 5), and a three-dimensional trilateration algorithm may be used to determine a location of the aviator within cockpit 100 and associate it with the one of captain chair 110 or copilot chair 120 or another chair.

Figure 2A:
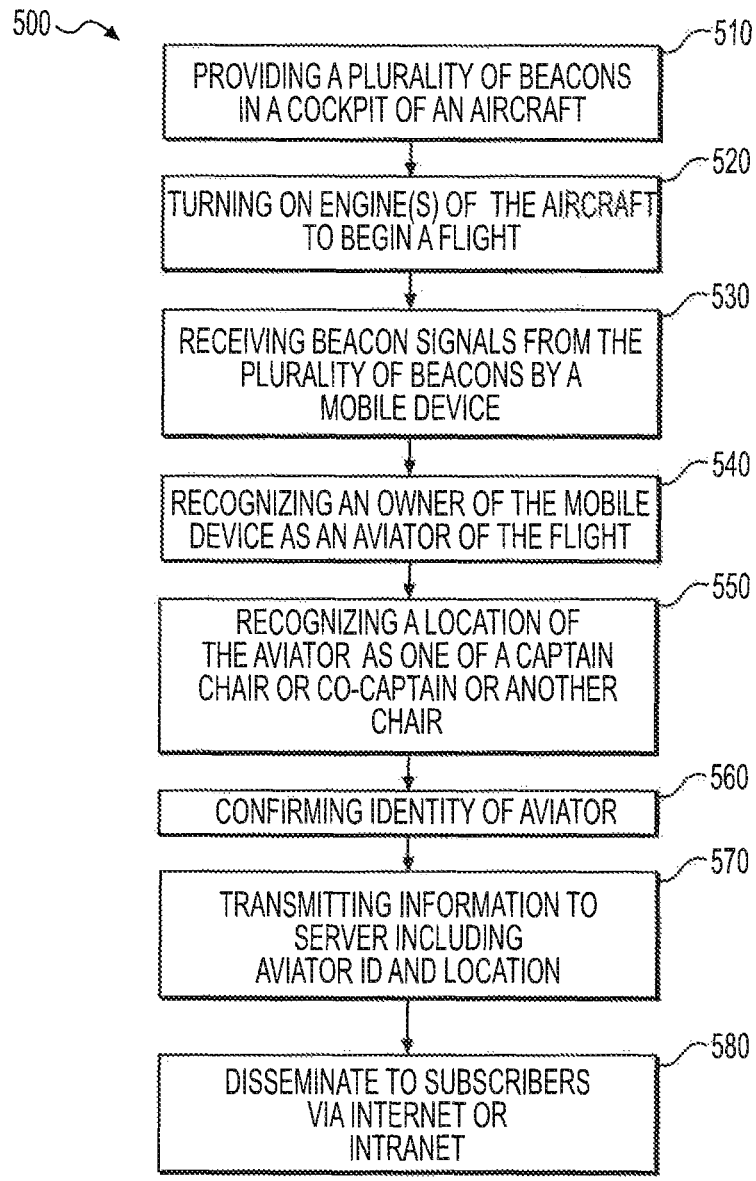
FIG. 2A is a flow chart of a method for recognizing an aviator in a cockpit of an aircraft according to an embodiment.
Figure 2B:
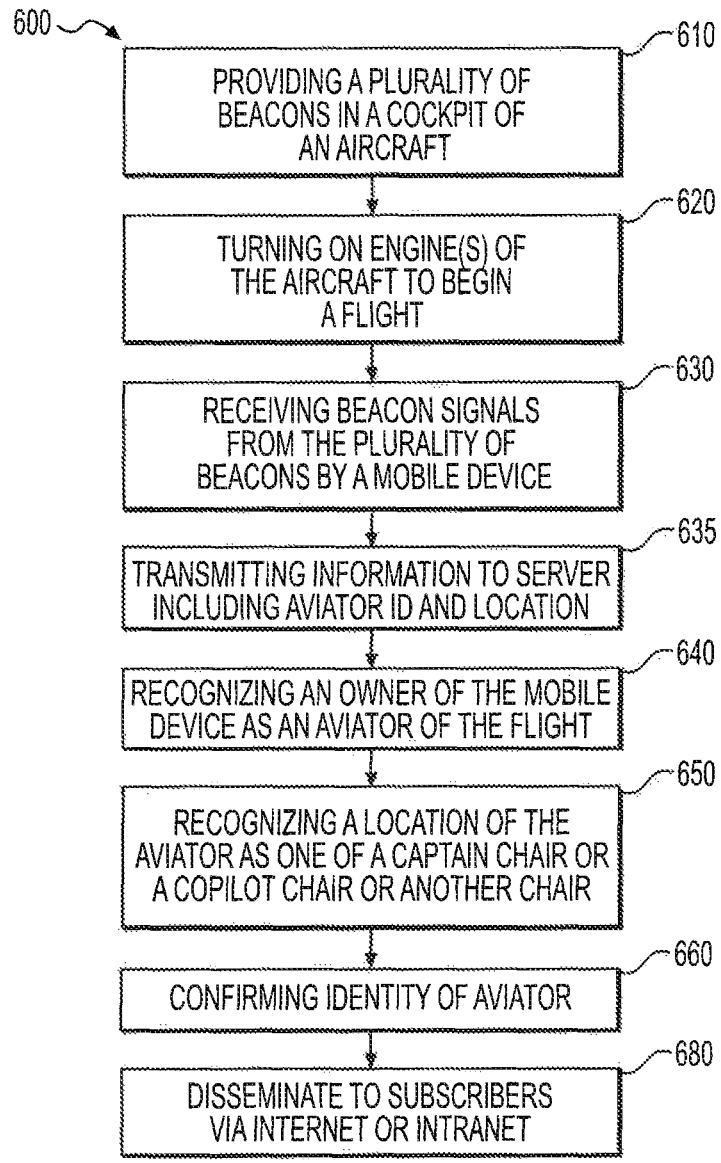
FIG. 2B is a flow chart of a method for recognizing an aviator in a cockpit of an aircraft according to another embodiment.
Figure 2C:
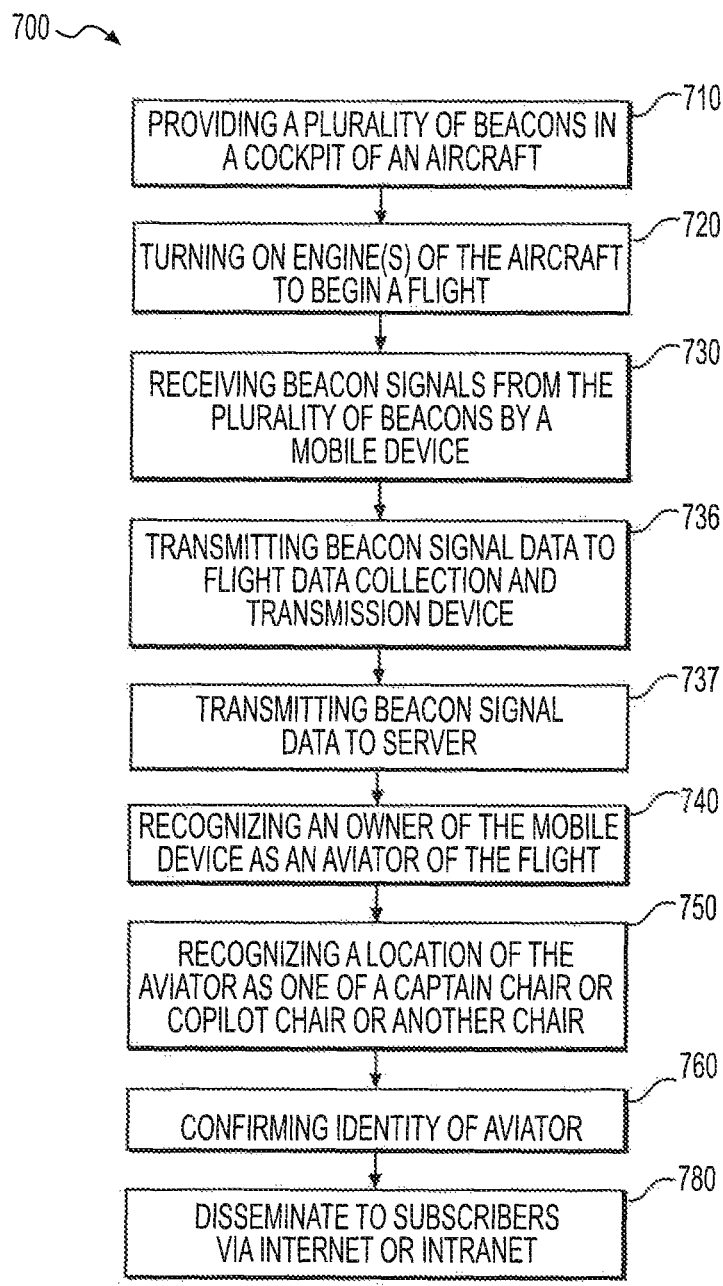
FIG. 2C is a flow chart of a method for recognizing an aviator in a cockpit of an aircraft according to another embodiment.

FIG. 2A is a flow chart of a method of recognizing an aviator in a cockpit of an aircraft according to an embodiment. FIG. 2B is a flow chart of a method for recognizing an aviator in a cockpit of an aircraft according to another embodiment. FIG. 2C is a flow chart of a method for recognizing an aviator in a cockpit of an aircraft according to another embodiment. The methods of FIGS. 2A-2C may utilize components of the automated aviator recognition system according to embodiments discussed herein.

The methods 500, 600, 700 may include providing a plurality of beacons in a cockpit of an aircraft (510, 610, 710). As discussed herein, the plurality of beacons may include a plurality of ranging beacons and a timing beacon.

The methods 500, 600, 700 may include turning on an engine(s) of the aircraft to begin a flight (520, 620, 720). The plurality of beacons may share a power source with the engine(s). Alternatively, one or more of the plurality of beacons may be battery-operated.

A mobile device within the cockpit may receive beacon signals from the plurality of beacons (530, 630, 730). A software application may be downloaded onto the mobile device. The mobile device may wirelessly receive the beacon signals.

A flight data collection and transmission device may collect the beacon data from the mobile device and application and send a file of stored beacon data directly to the server via an Internet or Intranet connection (736)(see FIG. 2C).

The methods 500, 600, 700 may further include recognizing an owner of the mobile device as an aviator of the flight (540, 640, 740), and recognizing a location of the aviator as one of a captain chair or a copilot chair or another chair in the cockpit (550, 650, 750).

The methods 500, 600, 700 may include confirming the identity of the aviator (560, 660, 760). For example, the methods 500, 600, 700 may include sending a message to the owner of the mobile device to confirm that he or she is the aviator.

The methods 500, 600, 700 may then transmit from the mobile device or flight data collection and transmission device aviator information, including identity and location of the aviator, or beacon signal information including the relative signal strength and/or timing at various intervals to a system server (570, 635, 737). The system server may then process the data and distribute the data to connected devices and systems (580, 680, 780) via the Internet or an Intranet.

The mobile device may collect, process, and store signal data and forward the processed signal data with aviator and flight information to the system server. Alternatively, the mobile device may collect signal data and forward the signal data to the system server for processing and determination of aviator and locations. Alternatively, the mobile device may collect signal data and forward the signal data to the flight data collection and transmission system for processing, storage, and transmission to the system server.

Figure 3:
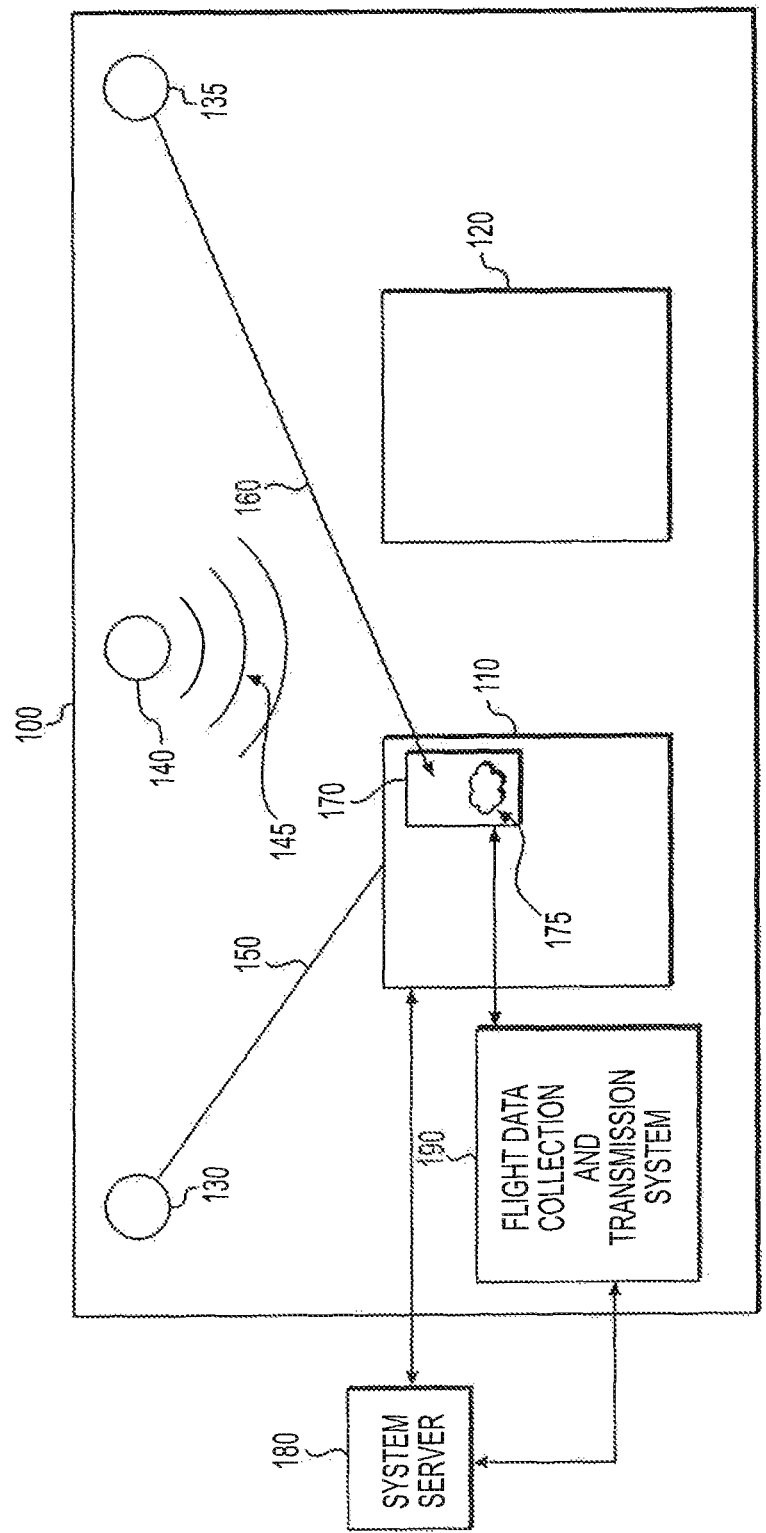
FIG. 3 is a schematic diagram of a cockpit of an aircraft employing an automated aviator recognition system according to an embodiment.

FIG. 3 is a schematic diagram of a cockpit of an aircraft employing an automated aviator recognition system according to an embodiment. This system may use simple beacon signal comparisons. Further, this embodiment may utilize various components disclosed herein with respect to various embodiments in various combinations.

According to this embodiment, a plurality of ranging beacons 130, 135 may be placed in upper corners of cockpit 100 of an aircraft so that each has a clear line of sight to captain chair 110 and copilot chair 120. A timing beacon 140 may be turned on at a start of a flight and turned off at an end of the flight. This may be done by connecting the timing beacon 140 to an engine dependent power source so that the timing beacon 140 is only powered when the engine(s) are on. The timing beacon 140 may emit a timing signal 145 that indicates that a flight is in progress. When the flight ends, the timing signal 145 may terminate. Mobile device 170, such as a mobile phone, may contain location app 175 which may communicate with the ranging and timing beacons 130, 135, 140, process their signal data, and determine a chair (captain chair 110 or copilot chair 120 or another chair) to which the mobile device 170 is closest, and send the information to system server 180. Alternately, after receiving the beacon signals, mobile device 170 may send the beacon signal data directly to system server 180 for pilot identification processing, or send the data to flight data collection and transmission device 190 which forwards the data to system server 180 for pilot identification processing. As discussed above, the location app 175 may be a software application downloaded onto the mobile device 170. According to this embodiment, the location app 175 may use the presence of the timing signal 145 to determine that the flight has started and is in progress.

Ranging signals 150 and 160 emitted by the ranging beacons 130, 135 may each be a periodic beacon signal of a predetermined signal strength. Ranging beacon 130 may be associated with the captain chair 110 as the ranging beacon 130 is closest to the captain chair 110 and ranging beacon 135 may be associated with the copilot chair 120 as the ranging beacon 135 is closest to the copilot chair 120. The location app 175 or server 180 after receiving stored beacon data may compare the received signal strength of each signal 150 and 160 and use the stronger of the two received signals to associate the mobile device 170 with the respective chair. If the ranging signal 150 from the ranging beacon 130 is the stronger signal, then the mobile device 170 may be associated with the captain chair 110 and vice versa.

During the flight time, these associations may be made one or more times and an average or weighted average of the associations used to make a final determination of with which chair the mobile device 170 is associated. When an Internet or Intranet connection is available, all relevant data may be sent from the mobile device 170 or flight data collection and transmission system 190 to server 180 which may process the data and distribute the data to Intranet or Internet connected client devices and systems.

In addition to relative signal strengths of the ranging signals 150 and 160, the location app 175 or server 180 may also use timing differences to estimate which beacon is closer. In this case, the ranging signals 150 and 160 may each contain timing information so that the location app 175 or server 180 may determine a ranging time delay from signal transmission to reception and calculate the distance based on that delay and a speed of radio transmission. The location app 175 or server 180 may send a message to the owner of the mobile device 170 to confirm the identity and location of the aviator. Further, the location app 175 or server 180 may send a message, for example, an on-screen alert to the mobile device 170 if the mobile device 170 is associated with the captain chair 100, requiring the owner of the phone to confirm his/her assignment as pilot of that flight.

Figure 4:
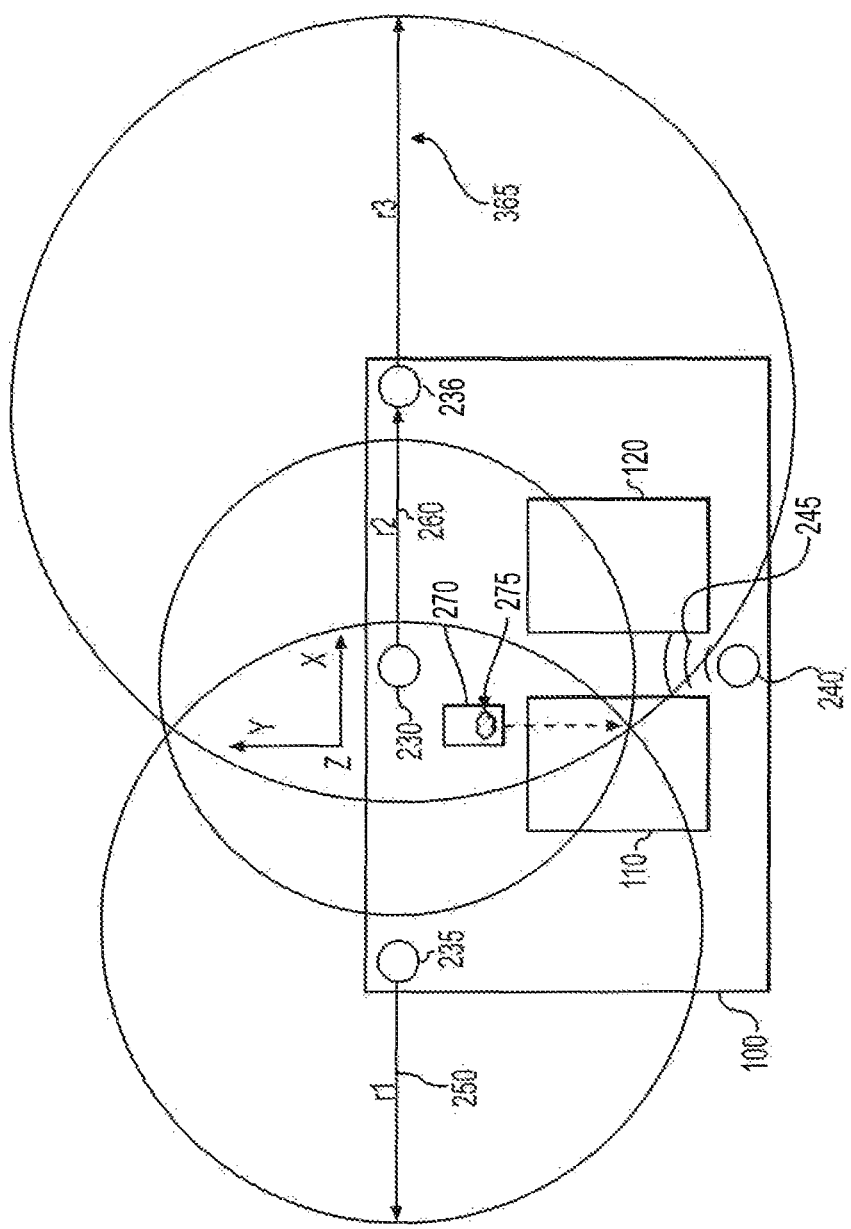
FIG. 4 is a schematic diagram of a cockpit of an aircraft employing an automated aviator recognition system according to an embodiment.

FIG. 4 is a schematic diagram of a cockpit of an aircraft employing an automated aviator recognition system according to an embodiment. This system uses two-dimensional trilateration. Further, this embodiment may utilize various components disclosed herein with respect to various embodiments in various combinations.

Ranging beacons 230, 235, and 236 may be placed in upper corners and an upper center of cockpit 100 so that each has a clear line of sight to captain chair 110 and copilot chair 120. The ranging beacons 230, 235, and 236 may be arranged such that at least two or all three are collinear on an x axis which runs across cockpit 100 laterally, that is, from left to right (a y axis may run from a front to a back of cockpit 100).

A timing beacon 240 may be turned on at a start of a flight and turned off at an end of the flight. This may be done by connecting the timing beacon 240 to an engine dependent power source so that the timing beacon 240 is only powered when the engine(s) are on. The timing beacon 240 may emit a timing signal 245 that indicates that a flight is in progress. When the flight ends, the timing signal 245 may terminate.

A mobile device 270, such as a smart phone, may contain location app 275 that communicates with the ranging beacons 230, 235, 236, processes their signal data, and determines with which chair the mobile device 270 is associated, or sends the beacon data to server 180 for location processing. The location app 275 may use the presence of the timing signal 245 to determine that the flight has started and is in progress. Ranging signals 250, 260, 265 from each beacon 230, 235, and 236 may each be a periodic beacon signal of a predetermined signal strength. The location app 275 or server 180 may compare the received power level from each of these signals to determine a range r1 of beacon 230, a range r2 of beacon 235, and a range r3 of beacon 236. Once these ranges are known, the location app 275 or server 180 may run a two-dimensional trilateration algorithm to compute an intersection point of three circles in which a radius is equal to each of the respective calculated ranges r1, r2, and r3. This intersection point is the location of the mobile device 270 within a x,y coordinate plane of cockpit 100 in which all three of the beacons 230, 235, 236 are located. The calculated position of mobile device 270 on the aircraft may then be associated with a position of captain chair 110 or copilot chair 120 directly below the x, y plane. During the flight, these associations may be made one or more times and an average or weighted average of the associations used to make a final determination of with which chair mobile device 270 is associated. When an Internet and/or Intranet connection is available all relevant data may be sent from mobile device 270 or flight data collection and transmission device 190 to server 180 which may process the data and distribute the data to Intranet or Internet connected client device and systems.

In addition to the relative signal strengths of beacons 230, 235, and 236, the location app 275 or server 180 may also use timing differences to estimate the respective ranges r1, r2, and r3 of each beacon. In this case, the beacon signals 250, 260, 265 would each contain timing information so that location app 275 or server 180 may determine a time delay from signal transmission to reception and calculate the respective ranges r1, r2, and r3 based on that delay and a speed of radio transmission. According to an embodiment, the location app 275 or server 180 may send an on-screen alert to the mobile device 270 if it deems the mobile device 270 to be associated with the captain chair 110, requiring the owner of the mobile device 270 to confirm his/her assignment as pilot of that flight.

Figure 5:
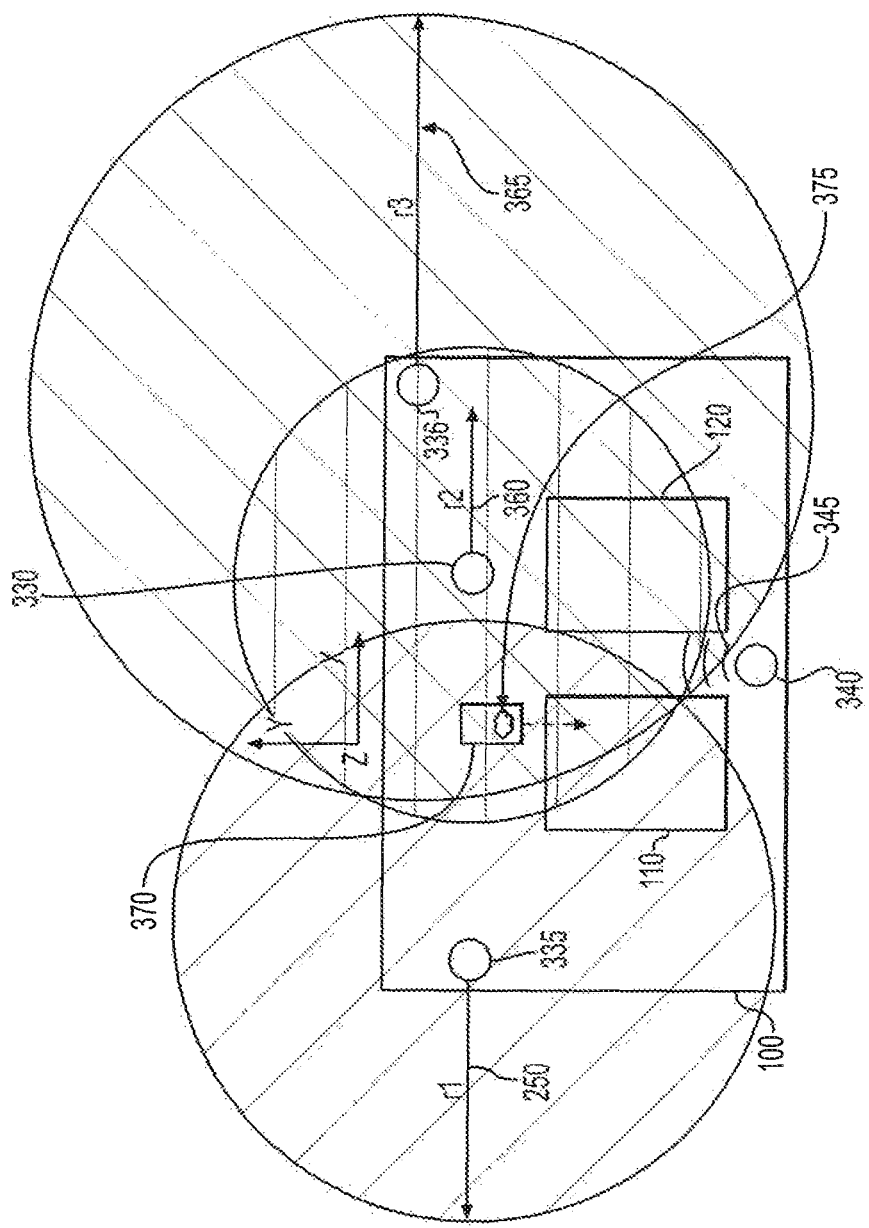
FIG. 5 is a schematic diagram of a cockpit of an aircraft employing an automated aviator recognition system according to an embodiment.

FIG. 5 is a schematic diagram of a cockpit of an aircraft employing an automated aviator recognition system according to an embodiment. This system uses three-dimensional trilateration for increased location precision and/or non-coplanar beacon placement. Further, this embodiment may utilize various components disclosed herein with respect to various embodiments in various combinations.

According to this embodiment, ranging beacons 330, 335, and 336 may be placed in upper corners and an upper center of a cockpit 100 of an aircraft so that each has a clear line of sight to captain chair 110 and copilot chair 120. The ranging beacons 330, 335, 336 may be positioned anywhere in a three dimensional x, y, z space of cockpit 100 in which the x axis runs across cockpit 100 laterally or from left to right, the y axis runs from a front to a back of cockpit 100, and the z axis runs through the page from a floor to a roof of cockpit 100. A timing beacon 340 may be turned on at a start of a flight and turned off at an end of the flight. This may be done by connecting the timing beacon 340 to an engine dependent power source so that the timing beacon 340 is only powered when the engine(s) are on. The timing beacon 340 may emit a timing signal 345 that indicates that a flight is in progress. When the flight ends, the timing signal 345 may terminate. A mobile device 370, such as a smart phone, may contain location app 375 which communicates with the beacons 230, 235, 236, 240, processes their signal data, and sends the signal data to flight data collection and transmission device 190, or to Internet/Intranet connected system server 180, or directly processes the signal data to determine with which chair the mobile device 370 is associated. In this embodiment, the location app 375 may use the presence of the timing signal 345 of the timing beacon 340 to determine that the flight has started and is in progress. Ranging signals 350, 360, 365 from each ranging beacon 330, 335, and 336 may each be a periodic beacon signal of a predetermined signal strength. The location app 375 or server 180 may compare the received signal strength from each of these signals to determine a range r1 of beacon 330, a range r2 of beacon 335, and a range r3 of beacon 336. Once these ranges are known, the location app 375 or server 180 may run a three-dimensional trilateration algorithm to compute an intersection point of three spheres in which a radius of each sphere is equal to each of the respective calculated ranges r1, r2, and r3. This intersection point is a location of mobile device 370 within the x, y,z coordinate space of the cockpit 100 in which all three of the ranging beacons 330, 335, 336 are located. The calculated position of the mobile device 370 on the aircraft may then be associated with a position of captain chair 110 or copilot chair 120 directly within the same x, y,z coordinate space. During the flight, these associations may be made one or more times and an average or weighted average of the associations may be used to make a final determination of with which chair the mobile device 370 is associated. When an Internet or Intranet connection is available all relevant data may be sent from the mobile device 370 or flight data collection and transmission device 190 to server 180 which may process the data and distribute the data to Intranet or Internet connected client devices and systems.

In addition to the relative signal strengths of beacons 330, 335, and 336, the location app 375 or server 180 may also use timing differences to estimate the respective ranges r1, r2, and r3 of each ranging beacon 330, 335, and 336. In this case, the beacon signals 350, 360, 365 may each contain timing information so that the location app 375 or server 180 may determine a time delay from signal transmission to reception and calculate the respective ranges r1, r2, and r3 based on that delay and a speed of radio transmission. According to an embodiment, the location app 375 or server 180 may send an on-screen alert to the mobile device 370 if it deems the mobile device 370 to be associated with captain chair 110, requiring the owner of the mobile device 370 to confirm his/her assignment as pilot of that flight.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section could be termed a second element, component, region, layer, or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

What is claimed is:

1. An automated aviator recognition system, comprising:
a plurality of beacons configured to be located in a cockpit of an aircraft, each emitting a beacon signal; and
a mobile device that communicates with the plurality of beacons, receives signal data from the plurality of beacons, sends the signal data to a system server via an Intranet or Internet connection or through a flight data collection and transmission device, wherein the system processes the signal data to identify an aviator in possession of the mobile device and identify a location of the aviator within the cockpit as one of a captain chair or a copilot chair or another chair based on the processed signal data, and provides aviator identification information to subscribed/authorized users and devices.

2. The automated aviator recognition system according to claim 1, wherein an application on the mobile device processes the beacon signals and identifies the aviator and the location of the aviator and sends the aviator identification information to the system server either directly or via the flight data collection and transmission device.

3. The automated aviator recognition system according to claim 1, wherein the mobile device comprises a smartphone or tablet, the smartphone or tablet communicating with the flight data collection and recording device and/or the system server via built-in wireless systems, the build-in wireless systems including Bluetooth, Wi-Fi, Cellular, or SATCOM.

4. The automated aviator recognition system according to claim 1, wherein the identification of the location of the aviator within the cockpit to one of the captain chair indicates that an owner of the mobile device is the pilot for the aircraft during a flight.

5. The automated aviator recognition system according to claim 3, wherein the mobile device alerts the owner of the mobile device that he or she has been identified as the aviator for the flight and allows the owner to manually confirm or deny.

6. The automated aviator recognition system according to claim 1, wherein the location of the aviator in the cockpit is identified as one of the captain chair or the copilot chair or another chair to which the mobile device is closest.

7. The automated aviator recognition system according to claim 1, wherein the identification of the location of the aviator within the cockpit as one of the captain chair or the copilot chair or another chair is performed two or more times and averaged or weighted averaged over a flight to determine with a high degree of statistical confidence in which chair was associated with the location of the aviator within the cockpit.

8. The automated aviator recognition system according to claim 1, further comprising a memory in which a location of the plurality of beacons to the captain chair and the copilot chair and any other chairs for each model of aircraft is stored.

9. The automated aviator recognition system according to claim 1, wherein the plurality of beacons includes at least two ranging beacons that each emits a periodic beacon signal at a predetermined signal strength, and wherein the system determines a respective range from the mobile phone to each of the at least two ranging beacons based on at least one of a received signal level or timing information.

10. The automated aviator recognition system according to claim 9, wherein the range of the mobile device to each of the at least two ranging beacons is determined based on a received signal level in comparison to the predetermined signal level at which the beacon signal was transmitted and known loss per unit distance.

11. The automated aviator recognition system according to claim 9, wherein the range of the mobile device to each of the at least two ranging beacons is determined based on a transit time for the beacon signal.

12. The automated aviator recognition system according to claim 1, wherein the plurality of beacons is configured to turn on and off with an engine of the aircraft.

13. The automated aviator recognition system according to claim 1, further comprising a software application configured to be downloaded onto the mobile device.

14. The automated aviator recognition system according to claim 13, wherein the system server communicates with the mobile device and/or the flight data collection and transmission device, and collects, processes, and disseminates information associated with the identified aviator and flight information received from the mobile device to connected devices and systems.

15. The automated aviator recognition system according to claim 1, wherein the flight data collection and transmission device communicates with the mobile device and the system server to collect, store, and/or transmit the signal data and/or information associated with the identified aviator and flight information received from the mobile device to the system server.

16. The automated aviator recognition system according to claim 1, wherein the plurality of beacons include three ranging beacons that each emits a periodic beacon signal at a predetermined signal strength coplanarly located in the cockpit, and wherein a two-dimensional trilateration algorithm is used to determine the location of the aviator within the cockpit and associate it with the one of the captain chair or the copilot chair or another chair.

17. The automated aviator recognition system according to claim 1, wherein the plurality of beacons include three ranging beacons that each emits a periodic beacon signal at a predetermined signal strength located in the cockpit, and wherein a three-dimensional trilateration algorithm is used to determine the location of the aviator with the cockpit and associate it with the one of the captain chair or the copilot chair.

18. The automated aviator recognition system according to claim 17, wherein the at least one timing beacon is turned on and off with an engine of the aircraft.

19. The automated aviator recognition system according to claim 1, wherein the plurality of beacons includes at least one timing beacon that emits a timing signal that indicates that a flight is in process.

20. The automated aviator recognition system according to claim 1, wherein the beacon signal emitted by each of the plurality of beacons is compatible with wireless communication including Bluetooth or Wi-Fi.

21. The automated aviator recognition system according to claim 1, wherein the plurality of beacons is battery powered.

22. An automated aviator recognition system, comprising:
a plurality of beacons configured to be located in a cockpit of an aircraft, each emitting a beacon signal;
a mobile device that communicates with the plurality of beacons;
a software application configured to be downloaded onto the mobile device, wherein the system processes signal data received from the plurality of beacons, and identifies an aviator in possession of the mobile phone and a location of the aviator within the cockpit as either a captain chair or a copilot chair based on the processed signal data; and
an Intranet or Internet server that communicates, collects, processes, and disseminates information associated with the identified aviator and flight information received from the mobile device to connected devices and systems.

23. An automated aviator recognition system, comprising:
a plurality of beacons configured to be located in a cockpit of an aircraft, the plurality of beacons including at least two ranging beacons that each emits a periodic beacon signal at a predetermined signal strength and at least one timing beacon that emits a timing signal that indicates that a flight is in process;
a mobile device that communicates with the plurality of beacons; and a software application configured to be downloaded onto the mobile device, wherein the system processes signal data received from the plurality of beacons, identifies an aviator in possession of the mobile phone, and uses a two or three dimensional trilateration algorithm to determine the location of the aviator with in the cockpit as one of a captain chair, a copilot chair, or another chair.

\* \* \* \* \*